US006001209A

United States Patent [19]

Popat et al.

[11] Patent Number: 6,001,209

[45] Date of Patent: Dec. 14, 1999

[54] DIVISIBLE LASER NOTE SHEET

[76] Inventors: Ghanshyam H. Popat, 10365 Bristol, Alta Loma, Calif. 91737; Anahit Tataryan, 10627 Bogue St., Temple City, Calif. 91780

[21] Appl. No.: 08/480,225

[22] Filed: Jun. 7, 1995

Related U.S. Application Data

[63] Continuation-in-part of application No. 08/343,023, Nov. 21, 1994, which is a continuation-in-part of application No. 08/063,213, May 17, 1993, Pat. No. 5,389,414.

[51] Int. Cl.[6] .............................. B32B 7/14; B32B 31/00

[52] U.S. Cl. .......................... 156/249; 156/277; 156/291; 428/41.8; 428/43

[58] Field of Search .................................... 156/268, 248, 156/252, 253, 249, 277, 291; 283/101, 103, 105, 109, 117; 428/43, 41.8

[56] References Cited

U.S. PATENT DOCUMENTS

| | | | |
|---|---|---|---|
| 2,304,787 | 12/1942 | Avery | 156/268 X |
| 4,214,024 | 7/1980 | Jacobson | 156/253 X |
| 4,690,720 | 9/1987 | Mack . | |
| 4,930,812 | 6/1990 | Howard . | |
| 4,950,517 | 8/1990 | Loggins . | |
| 4,995,641 | 2/1991 | Landry et al. . | |
| 5,029,903 | 7/1991 | Pennock . | |
| 5,030,491 | 7/1991 | Shoesmith | 428/42.2 |
| 5,132,915 | 7/1992 | Goodman | 364/479 |
| 5,154,956 | 10/1992 | Fradrich . | |
| 5,183,297 | 2/1993 | Bodziak et al. . | |

(List continued on next page.)

OTHER PUBLICATIONS

Avery “Laser Name Badge Labels,” Avery Product Code 5895, with Photocopy of Packaging for the Labels ©1991.

Avery “Laser Name Badge Labels,” Avery Product Code 5095, with Photocopy of Packaging for the Labels ©1991 and with Booklet Entitled “Using Avery Name Badge Laser Labels” ©1991.

Avery “Laser Videotape Labels,” Avery Product Code 5199, with Photocopy of Packaging for the Labels ©1993.

Avery “Videotape Laser Labels,” Avery Product Code 5199, with Photocopy of Packaging for the Labels ©1990.

Avery “Laser Labels,” Avery Product Code 5160, First Sold in 1986.

Avery “Laser Labels,” Avery Product Code 5163, Sold at Least as Early as 1990.

Continental Dataforms 1991 Distributor Net Price List.

Avery Laser Run Product Literature, Published Prior to 1992.

Two Advertisements for 3M “Post–It Copyable Labels and Notes” Product, ©1988.

3M “Post–It” Notes, Product No. 655, Sold at Least as Early as 1991.

*Primary Examiner*—Curtis Mayes
*Attorney, Agent, or Firm*—Oppenheimer Wolff & Donnelly LLP

[57] ABSTRACT

A method for preparing and printing adhesively-backed notes includes several steps. A divisible note assembly for printing in a laser or ink-jet printer or photocopier is first prepared. The note assembly has a divisible backing sheet and a divisible note paper sheet having a pressure sensitive adhesive coating thereon. The assembly is divided into at least two subsections by perforations extending through both the note paper sheet and the backing sheet. The user prints onto one or more notes with a laser or ink-jet printer or a photocopier. The user may separate one or more subsections from the assembly either before or after printing. If separated before printing, the user may print on less than the full assembly and may save the remainder of the assembly for later use. After printing, the user removes the backing sheet from the subsection and applies the note paper to a substrate. Each note may have an adhesive stripe on the back thereof, with the backing sheet being a strip that covers the adhesive stripe but which is not fully coextensive with the note paper sheet.

17 Claims, 6 Drawing Sheets

U.S. PATENT DOCUMENTS

| | | |
|---|---|---|
| 5,200,242 | 4/1993 | Hohmann . |
| 5,219,183 | 6/1993 | McKillip . |
| 5,262,214 | 11/1993 | Instance . |
| 5,316,344 | 5/1994 | Popat et al. . |
| 5,332,265 | 7/1994 | Groess et al. . |
| 5,340,628 | 8/1994 | McKillip . |
| 5,370,420 | 12/1994 | Khatib et al. . |
| 5,382,055 | 1/1995 | Mertens et al. . |
| 5,389,414 | 2/1995 | Popat . |
| 5,399,403 | 3/1995 | Instance . |
| 5,407,718 | 4/1995 | Popat et al. . |
| 5,417,790 | 5/1995 | Petrou . |
| 5,418,026 | 5/1995 | Dronzek, Jr. et al. . |
| 5,421,942 | 6/1995 | Hoffman . |
| 5,470,418 | 11/1995 | Instance . |
| 5,575,574 | 11/1996 | Mertens . |

FIG. 6
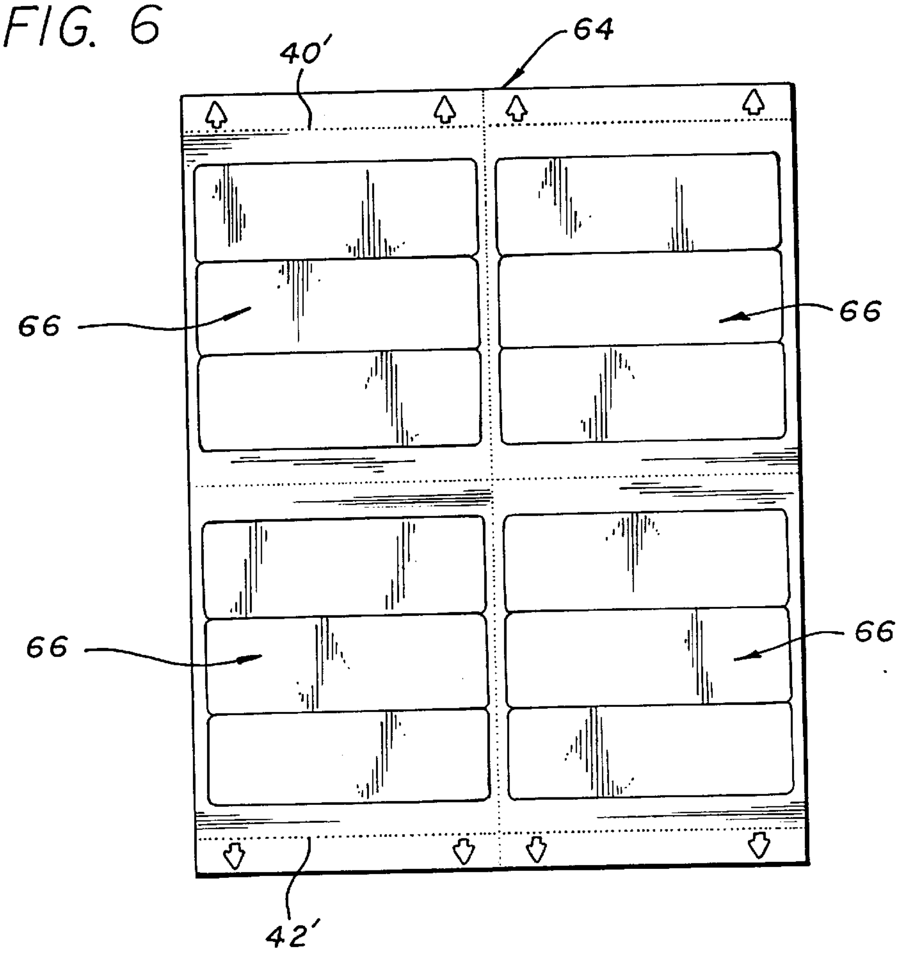
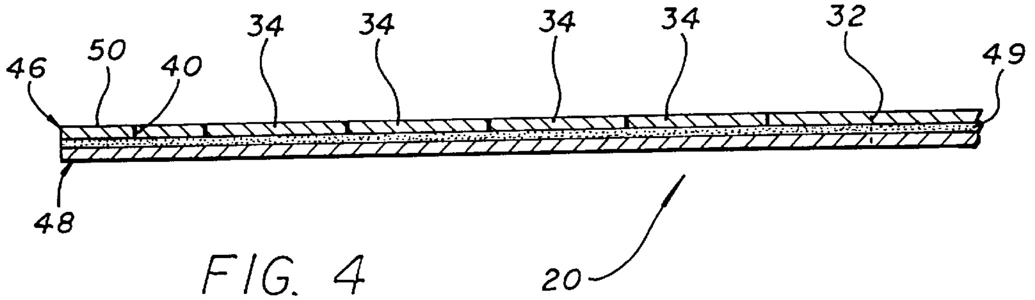
FIG. 4

FIG. 7
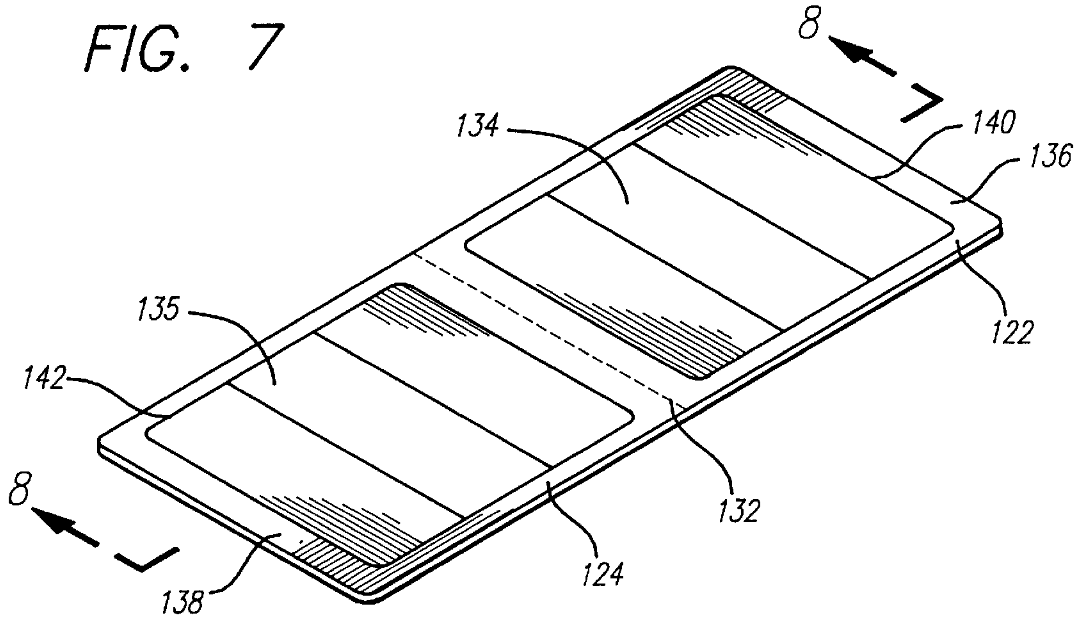
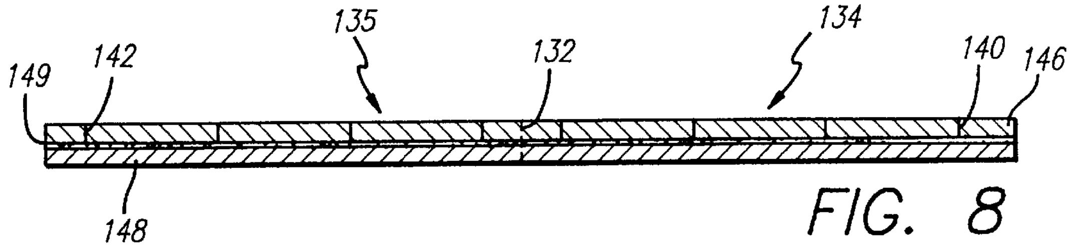
FIG. 8
FIG. 9
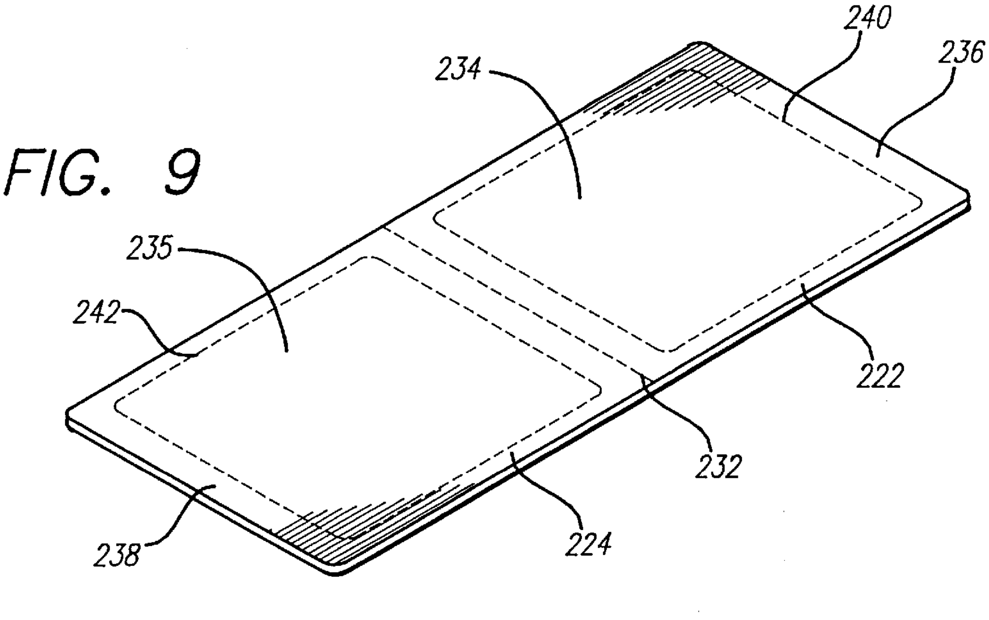

DIVISIBLE LASER NOTE SHEET

CROSS-REFERENCE TO RELATED APPLICATION

This application is a continuation-in-part of U.S. patent application Ser. No. 08/343,023, filed Nov. 21, 1994, which in turn is a continuation-in-part of U.S. patent application Ser. No. 08/063,213, filed May 17, 1993 and now issued as U.S. Pat. No. 5,389,414, entitled DIVISIBLE LASER LABEL SHEET.

FIELD OF THE INVENTION

The present invention relates generally to a multiple purpose, sheet assembly that may be divided into subsections and to a method for printing the subsections in laser printers, ink jet printers and photocopiers.

BACKGROUND OF THE INVENTION

Laser printers and ink jet printers have spawned a wide variety of options for personal printing that have not existed previously. A personal computer user can now prepare text on a word processing program and print the text directly onto sheets that pass through the laser or ink jet printer. Such sheets may consist of paper, labels applied to a backing sheet, card stock and a variety of other materials. The sheets may have a variety of different dimensions and can usually be fed into the laser or ink jet printer through a standard paper tray.

One way in which secretaries, in particular, have used laser and ink jet printers has been to print reminder notes and telephone messages on full-sized sheets of paper. A secretary will often post such a note on a surface for someone else to see, such as on a file or on a computer screen. To hold the note in place, the secretary will often use a clip or tape.

This approach has at least two drawbacks that become apparent in every day use. First, the secretary frequently does not really need to print on a full sheet of paper, particularly for brief messages. A smaller sheet of paper would be usually provide sufficient space for a message, and paper is wasted when a full sheet is used.

Secondly, the secretary must have tape or a clip nearby in order to attach the sheet to the desired surface. If the secretary is out of tape or clips and the sheet is not attached to a surface or file, the sheet may get lost and the message never delivered.

With the introduction of adjustable manual feed guides such as those found on the Hewlett Packard LaserJet II, III and IV laser printers and other printers, users may now print on sheets smaller than the typical 8½×11 inch full sheet size. For example, many laser printers may print sheets that are as small as 4 inches long and 3 inches wide. However, to print message notes smaller than a full sheet, the user typically must cut full-sized sheets down to size. Even then, the user must have tape or clips nearby in order to post the message notes.

SUMMARY OF THE INVENTION

Broadly considered, a versatile method for preparing and printing adhesively-backed message notes includes a number of steps. The method includes preparing a divisible note assembly for printing in a laser, ink-jet, photocopier or similar printer. The assembly has a divisible backing sheet and an adhesively-backed divisible note paper sheet that mounts onto the backing sheet. The assembly is divided into at least two subsections by microperforations that extend through both the note paper sheet and the backing sheet. The user prints a message onto a note paper on a subsection of the label sheet assembly using a laser printer, ink jet printer or photocopier. The user separates at least one of said subsections from the assembly (either before or after the printing step) along a line of microperforations. The user removes the backing sheet from the subsection, and applies the note to a substrate.

The present invention is helpful in overcoming the shortcomings of the prior art in a number of ways. The versatile note preparation method provides a sub-dividable assembly that gives the user the choice of printing a full sheet, or of printing a smaller section of a full sheet when printing on a smaller area is desired. The method is environmentally efficient in that a small note may be printed without having to dispose of extra, unused paper area. Certain embodiments of the present invention may include a temperature stable adhesive which can withstand the high-heat environment of a laser printer. The method may be applied to a variety of assemblies having different sheet sizes, including smaller sheets which can be efficiently stored in a desk drawer or on a small shelf. Additionally, the present method for preparing small notes is convenient for anyone having access to a personal computer and a laser printer, ink jet printer, photocopier, or other advanced printer.

In one preferred embodiment of the method, each of the subsections is between approximately 3 and 5 inches wide by between approximately 4 and 6 inches long, in order to meet the minimum width and length requirements of laser and ink jet printers. In this embodiment, a message note assembly having two sections would be between approximately 3 and 5 inches wide by between approximately 8 and 10 inches long.

The method may further include the step of cutting or perforating one or more flexibility line into a leading edge portion of the assembly. The flexibility lines increase the flexibility of the assembly and reduce the possibility that the assembly will jam in the complex printer path of a laser printer, ink jet printer, photocopier, or other printer. The step of cutting or perforating flexibility lines may include cutting or perforating the flexibility line approximately ½-inch from the leading edge of the assembly to provide sufficient flexibility to prevent jamming. considering one embodiment of the present invention in more detail, a method for handling small size sheets may include forming a sheet assembly approximately at least 3 inches by at least approximately 8 inches. The sheet assembly has an upper sheet with pressure-sensitive adhesive on at least a portion of the rear side thereof, and also having a second sheet at least covering the pressure-sensitive adhesive. The line of perforations is formed across the sheet assembly to divide the sheets into at least two subsheets, each at least approximately 3 inches wide by at least approximately 4 inches long, with the perforations extending through both the upper and second sheet. The sheet assembly is separated along the line of perforations into two subsheets. Information is printed on the upper sheet by feeding at least one of the subsheets through a printer. The second sheet that covers the pressure-adhesive on one of the subsheets is removed. The pressure-sensitive adhesive and the upper sheet are applied to a substrate.

This method may be supplemented in a variety of ways. The perforations may be microperforations, having at least 35 cuts and ties per inch. The assembly may be made to be substantially flat and substantially free of apertures, such as tractor feed holes found on sheets printed on dot matrix printers. The method may include the step of dividing the assembly into two identical halves by the line of perforations, with the line of perforations being a line of symmetry. The step of printing information on the upper sheet by feeding at least one of the subsheets through a printer may further include adjusting printer feed guides to a width approximately equal to that of one of the subsheets. The upper sheet may be formed of substantially transparent paper or transparent film so that the color and/or texture of a substrate may be viewed through the upper sheet. Adhesive which is stable up to at least 200° C. for at least 0.1 seconds may be used to prevent the adhesive from oozing out of the label assembly in the high-heat environment of a laser or xerographic printer.

Embodiments of the present invention may be formed with limitations on the thickness, such as 12 mils or 15 mils. Such thickness limitations are intended to insure that the present label assemblies are sufficiently thin to pass through current laser printers, ink jet printers, and photocopiers.

Other objects, features, and advantages of the invention will become apparent from a consideration of the following detailed description and the accompanying figures.

BRIEF DESCRIPTION OF THE DRAWINGS

FIG. 4 is a sectional view taken along section 4—4 of FIG. 1 showing the die cut labels adhering to an underlying backing sheet;

FIG. 6 is a top perspective view showing a full-sized sheet having separable sections each having three labels;

FIG. 7 is a top perspective view of a smaller embodiment of a divisible label sheet assembly;

FIG. 8 is a sectional view taken about Line 8—8 of FIG. 7;

FIG. 9 is a top perspective view of a divisible sheet having closed patterns of perforations defining removable cards;

DETAILED DESCRIPTION OF THE PREFERRED EMBODIMENTS

The disclosures of the grandparent patent, U.S. Pat. No. 5,389,414, and of the parent patent application, U.S. patent application Ser. No. 08/343,023, are hereby incorporated by reference.

Figure 1:
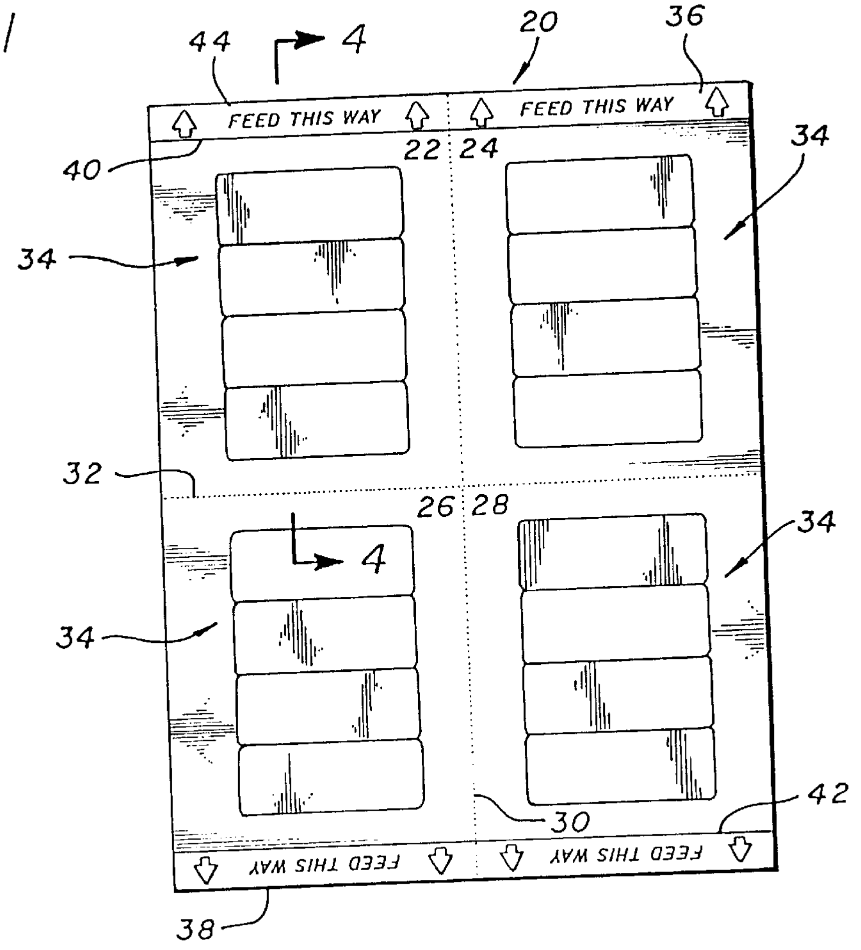
FIG. 1 is a top perspective view showing a full-sized label sheet having four separable sections each having four labels.

Referring more particularly to the drawings, FIG. 1 illustrates an embodiment of a double thickness label sheet assembly. The label sheet 20 is divided into four subsections 22, 24, 26, and 28, which are separated by perpendicular lines of microperforations 30 and 32. Each subsection includes a set of labels 34 that is generally centered within the subsection. Leading edge portions 36 and 38 comprise die cut flexibility lines 40 and 42, and indicia 44 to indicate the proper direction for feeding a label subsection into a laser printer, such as that illustrated in FIG. 2. "Leading edge" refers to that edge which is fed into the printer first.

FIG. 4 is a cross-sectional view of subsection 22 taken along section 4—4 of FIG. 1. FIG. 4 shows that the label assembly 20 includes a label layer 46 which is mounted on a backing layer 48. The label sheet has a pressure sensitive adhesive coating 49 which allows the label sheet to mount onto the backing layer 48, which has a silicone release coating to permit a user to remove labels from the backing layer. The release coating may alternatively be fluorinated or amine-based rather than silicone, or may be any other suitable coating.

*The Hewlett Packard LaserJet* 4 *and* 4*M Printers User's Manual*, Second Edition, March 1993, specifies that materials inserted into the printer must be stable in the presence of temperatures up to about 200° C. for at least 0.1 second to withstand the significant heat encountered in the printers' fusing process. Consequently, the adhesive of embodiments of the present invention may be selected to be temperature stable to a temperature of 200° C. for at least 0.1 second for this popular model of laser printer and those like it. Such an adhesive may be the P-09 acrylic adhesive sold by Avery Dennison Corporation, or a rubber based adhesive of styrene butadiene and ABA block copolymers compounded with tackifying resins. However, it is important to note that any suitable stable, pressure sensitive adhesive may be used which facilitates printing at high temperatures and peeling the labels from the backing layer 48.

FIG. 4 also shows that flexibility line 40 is die cut through label layer 46, but not through backing sheet 48. The purpose of the flexibility line is to allow the leading edge 50 to easily bend around the various twists and turns in a conventional laser printer feed path. Consequently, flexibility line 40 has the effect of avoiding paper jamming which may occur with sheets having more rigid leading edges.

Label set 34 is die cut out of the label layer 46. As seen in FIG. 4, the die cuts pass through the label layer but not the backing layer. Thus, the backing layer is left intact when the labels are removed.

FIG. 4 also shows perforation line 32, which separates subsection 22 from subsection 26. The perforation line 32 passes through both label layer 46 and backing layer 48, so that subsection 22 can be completely separated from subsection 26. The perforations are preferably closely spaced "microperforations" which leave a relatively smooth edge when the subsections are separated. "Microperforations" generally have at least thirty five cuts per inch, although many more cuts per inch may be used. It should be understood, however, that the term "microperforations" is intended to encompass all constructions in which the edges of the backing sheet are smooth and substantially free of coarse irregularities following separation.

Figure 2:
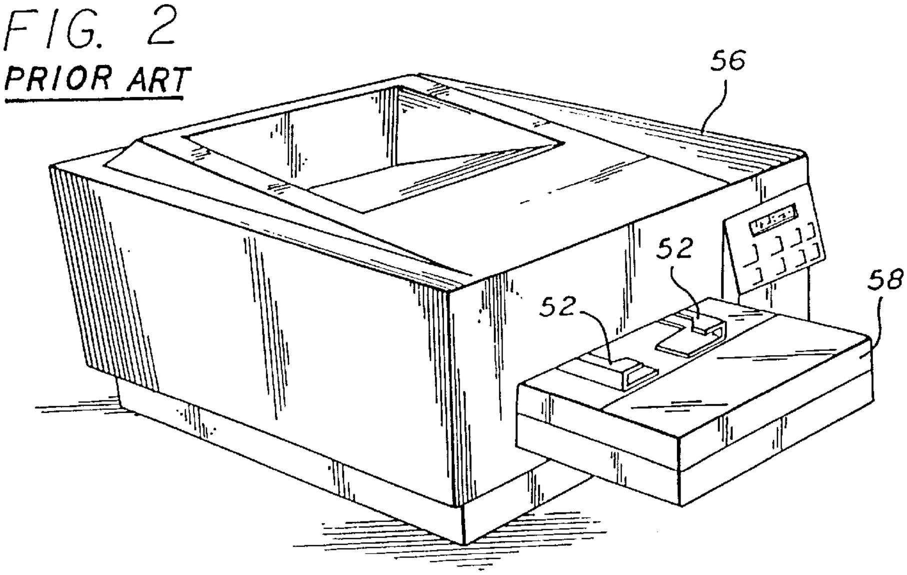
FIG. 2 PRIOR ART
FIG. 2 is a perspective view of a conventional laser printer having adjustable sheet guides for printing sheets having dimensions less than standard sheet size.
Figure 3:
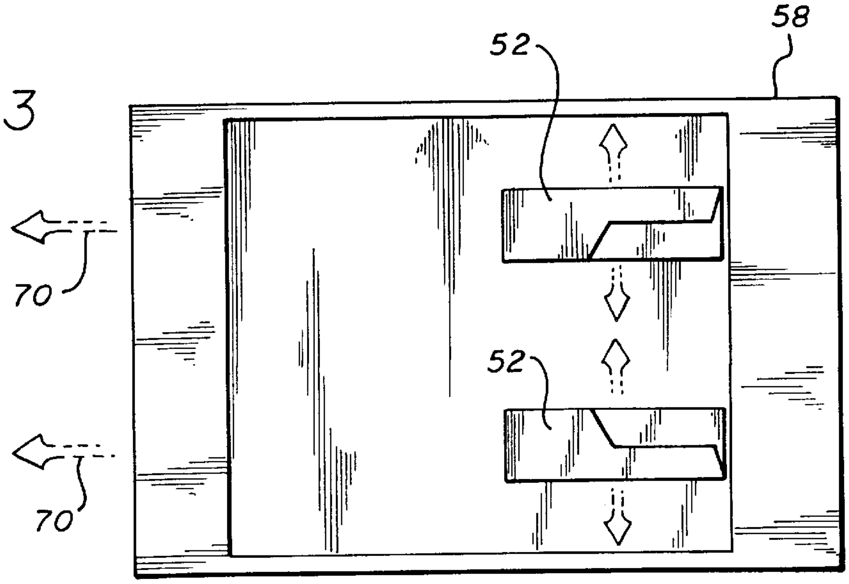
FIG. 3 is a top perspective view of a laser printer paper tray having adjustable manual feed guides which a user can adjust to accommodate a section of labels having dimensions less than 8½x11 inches.

FIG. 2 illustrates a typical laser printer 56 having a paper tray 58. Full sized sheets of paper or labels may be stored inside the paper tray for automatic feeding into the laser printer. Alternatively, paper or label sheets may be fed into the printer manually at adjustable manual feed guides 52, which are shown more clearly in FIG. 3. A user may adjust these guides to input sheets of various widths into the laser printer for printing. Consequently, a user can adjust the feed guides in order to input a subsection of label sheet 20 for printing. Arrows 70 indicate the direction in which labels feed into laser printer 56.

An illustrative method of preparing small sets of labels from label sheet 20 is as follows. The user divides label sheet 20 into quarters along perforation lines 30 and 32, such that subsections 22–28 are separated from each other. The user then adjusts manual feed guides 52 on laser printer paper feed tray 54 to accommodate the non-conventional width of an individual subsection of label sheet 20. The user inserts a subsection of the label sheet into the manual feed guide, then sends a print command to the laser printer 56 to initiate printing.

Figure 5:
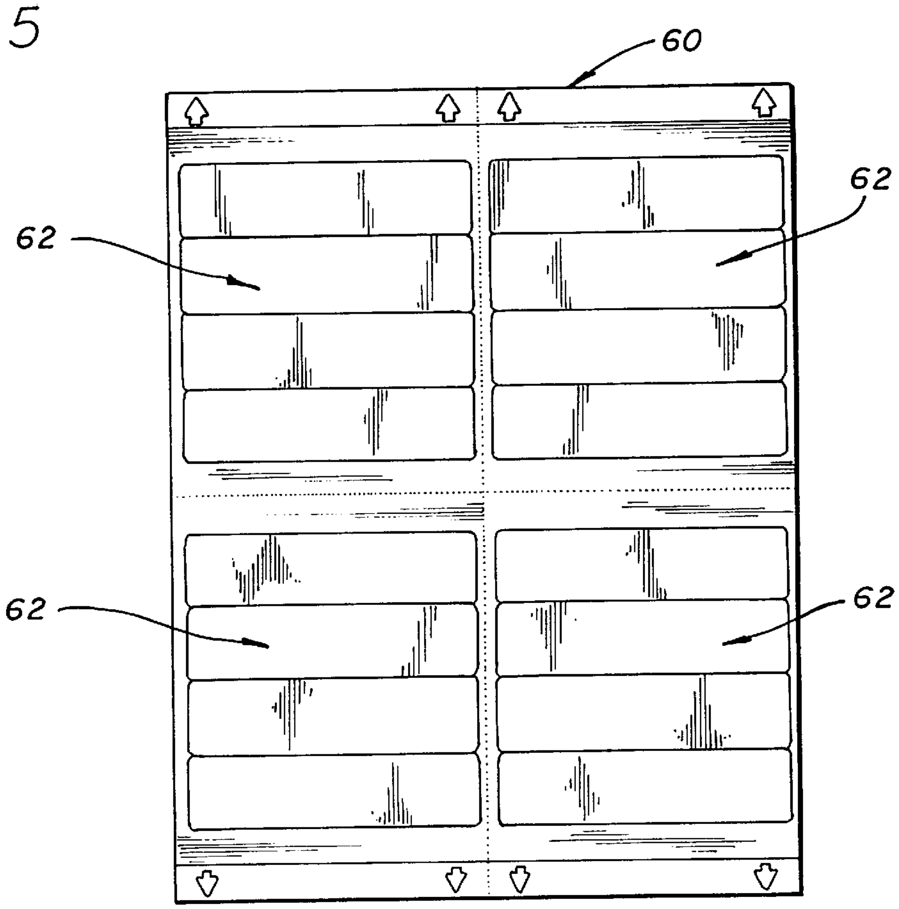
FIG. 5 is a top perspective view showing a full-sized sheet having four separable sections each having four wide labels.

FIGS. 5 and 6 illustrate alternative embodiments of the present invention. FIG. 5 illustrates a label sheet 60 having label sets 62. Each of these label sets 62 feature four labels that are considerably wider than the four labels of label set 34 of FIG. 1. Similarly, FIG. 6 illustrates a label sheet 64 having label sets 66 with three, rather than four, labels per subsection. In FIG. 6, increased flexibility is provided by the perforation lines 40' and 42' which serve substantially the same function as the die cut lines 40 and 42 of FIG. 1.

FIG. 7 illustrates a divisible label assembly having dimensions of between approximately 3 and 5 inches wide by approximately 10 or 11 inches long. For a two-sheet assembly, these ranges help ensure that each subsheet will individually satisfy the minimum dimension requirements of at least some popular laser and ink jet printers. However, it should be noted that minimum dimension requirements have been falling as printer technology has evolved. Consequently, the embodiment of FIG. 7 may have dimensions smaller 3 inches wide and 10 inches long.

More generally, the assembly of FIG. 7 may be at least approximately 3 inches wide by at least approximately 8 inches long to provide sufficient space on each subsection for one big label or several smaller diecut labels. A convenient assembly size for the embodiment of FIG. 7 is approximately 4¼ inches wide by 10 or 11 inches long, and is presently considered the preferred dimension of such an assembly.

Line of microperforations 132 is located on a line of symmetry of the label assembly. Line of perforations 132 extends through both the label layer 146 and the backing layer 148. Line of microperforations 132 separates the assembly into two subsheets 122, 124, which are mirror images of each other.

Subsheet 122 has a leading edge 136, while subsheet 124 has a leading edge 138. A die cut 140 extends across most of the width of subsection 122 to provide flexibility as subsection 122 feeds into the complex printer feed path of a laser or ink jet printer. Die cut line 140 is inset from the very edge of the leading edge area 136 by about ½-inch. Similarly, subsection 124 has a die cut flexibility line 142 which is inset approximately ½-inch from the very edge of leading edge 138.

As seen in FIG. 7, die cut lines 140, 142 serve the dual function of providing flexibility and defining one edge of a label. Subsection 122 includes label set 134, while subsection 124 includes label set 135. Both label sets are typically die cut, although they may alternatively be cut with laser cutters or water jets. FIG. 8 illustrates that the die cuts defining the labels extend through label layer 146, but do not extend through backing layer 148. It might be noted that any of the transverse die cut lines shown in FIG. 7 may be considered lines of flexibility.

The concept of providing a standard sized sheet that can be broken down into subsections for printing in a laser printer can be extended beyond use with only labels. For instance, a standard sized sheet of card stock can be perforated to form several subsections, each having a set of separable business cards or 3 inch by 5 inch index cards rather than labels. With business cards normally having a size of 3½ inches by 2 inches, a plurality of business cards could be mounted on each mini-sheet.

To print only one or just a few cards at a time, the standard sized sheet may be broken down into the subsections, which are then fed through the manual feed guides and into the laser printer. Such sheets may have increased flexibility at the feed edges thereof by providing a perforation line similar in location to lines 40 and 42 of FIG. 1, although not necessarily extending fully across the width of the subsections. With card stock greater than about 0.007 inch thick or about 7 mils, it is preferable to have a line of perforations, either partial or full, extending along the leading edge of the mini-sheet, about ½-inch from the edge, to provide the desired increased flexibility.

FIG. 9 illustrates a further embodiment of the present invention. A single layer sheet of card stock is divided by a line of microperforations 232 into two identical sections. Each section 236, 238 includes a closed pattern of perforations to define a removable card. FIG. 9 shows one removable card 235 associated with subsection 224, and a second card 234 associated with subsection 222. Each subsection includes a line of perforations inset from and running parallel to a leading edge. Thus, FIG. 9 illustrates a line of perforations 142 inset approximately ½-inch from the very edge of leading edge 238. Similarly, a line of microperforations 140 runs parallel to the very edge of leading edge 236. Both lines of perforation 240, 242 provide flexibility to the card stock at the leading edge to prevent the card stock from jamming within the printer. It has been determined that card stock having a thickness of greater than about 7 mils will tend to jam in the feed path of most laser printers. Consequently, lines of perforation such as 240, 242 are necessary to prevent such embodiments from jamming in the laser printer. However, it should be noted that card assemblies having a thickness of 7 mils or less do not generally need lines of flexibility such as 240, 242.

Although not illustrated in the present drawings, an embodiment such as FIG. 9 for printing cards may include an adhesively coated piece of transparent plastic lamination which is coextensive with and which adheres to the top surface of the card stock. The card stock may be coated on the top with a release coating in areas so that the lamination may be removed from those areas. However, at the top surface of the card, there would be no release coating. A user may print indicia on the lower surface of the card stock, then detach the card along the lines of perforation from the card stock. The user also removes the lamination from the release-coated areas of the upper surface of the assembly. The user then folds the lamination over about the removed card to laminate the card. The user may then trim any excess lamination with scissors, or the lamination may be sized such that no trimming is necessary.

As other alternatives, the cards of FIG. 9 may have various shapes, for example, the cards may be shaped to have ears which may be inserted into slots in hanging file folders. The user prints indicia on the card, punches the card out of the assembly along the lines of perforation, then inserts the ears of the card into the hanging file folder slots. As yet another alternative, a lamination/card set such as that described above may be shaped such that the lamination strip may be folded about the card with excess length of lamination extending beyond the length of the card on both the front and back. This then defines a self-adhering index tab which may be applied to the page of notebook or other member. Numerous other uses may be implemented for this card embodiment. In general, it is anticipated that the sheet of card stock for these embodiments will be between 7 and 10 mils thick. However, thinner sheets may also be used, including sheets of paper.

The embodiment illustrated in FIG. 9 may be modified such that there are a plurality of individual smaller cards on one or both of the subsections. So, for instance, 20 or more rectangular index tab insert cards can be defined by a pattern of microperforations on one or both of the subsections.

It should be noted that a variety of labels and other products have been previously provided for use in dot matrix printers. Generally speaking, these products include tractor feed holes arranged in a spaced relationship along the sides of the assemblies. However, these tractor feed holes are not appropriate for use in laser printers, ink jet printers, and photocopiers. Consequently, many of the various embodiments of the present invention are substantially flat on both their upper and lower surfaces and have no open apertures, such as tractor feed holes.

One embodiment of the present invention is a divisible sheet of labels having a transparent paper or transparent film label sheet having an adhesive coating and being adhered to a backing sheet. The labels are die cut or otherwise cut from the transparent paper or transparent film sheet. The backing sheet is generally coated with a release coating to facilitate convenient removal of the labels. One suitable transparent paper is Gateway Natural Tracing Paper, manufactured by Chartham Paper Mill, Canterbury, Kent, England. In embodiments incorporating plastic films, a polyester film having a print-receptive surface may be used. Suitable plastic films are available from Protect-All, Inc. of Darien, Wisconsin. Coatings to enhance print receptivity are available from Precision Coatings, Inc. of Walled Lake, Mich.

Figure 10:
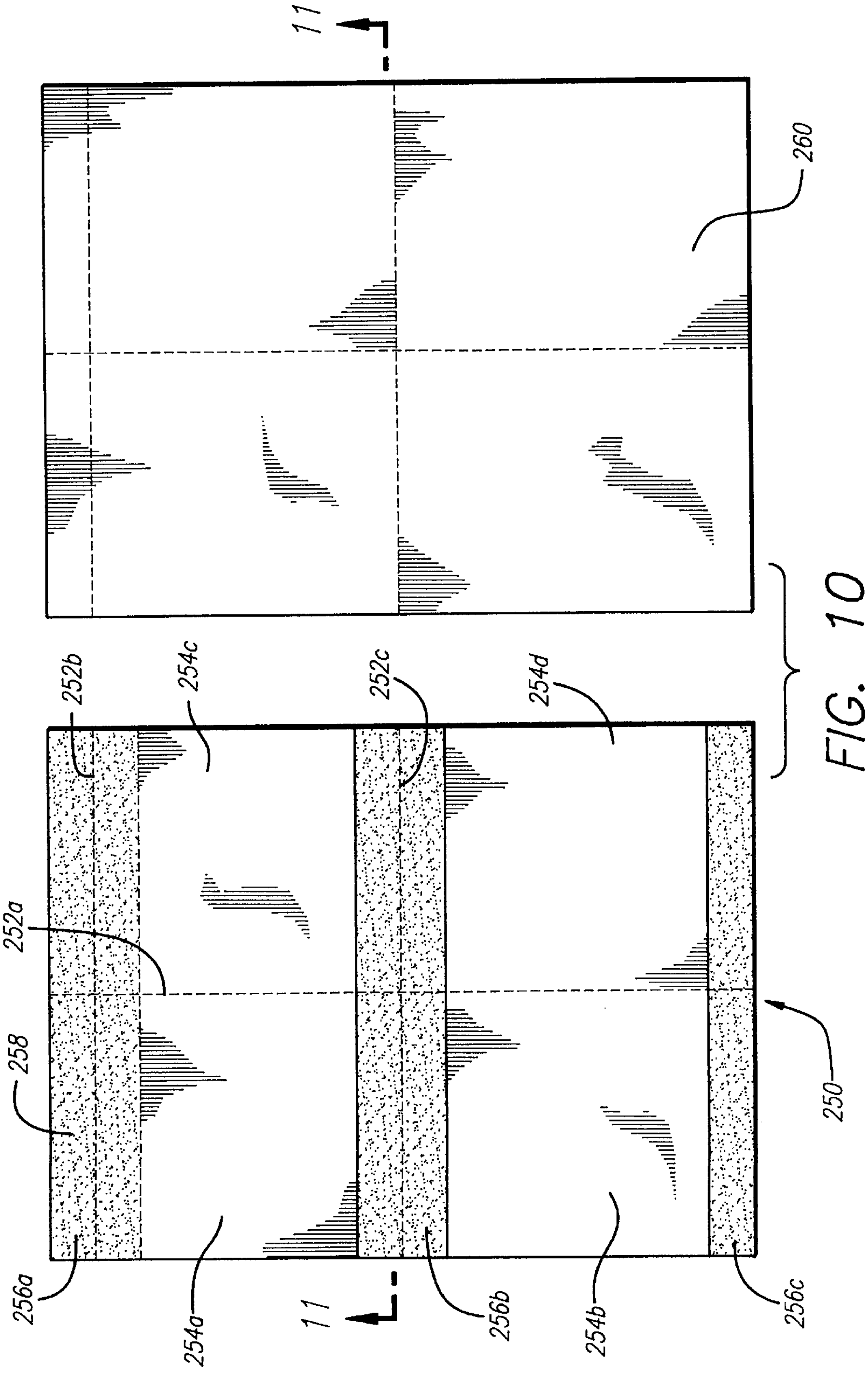
FIG. 10 is an exploded view of adhesively-backed, divisible sheet of laser-printable notes with a full backing sheet.

The present invention also extends to sheets of adhesively backed note paper. FIG. 10 illustrates a sheet of note paper 250 that is subdivided by perforation lines 252*a*, 252*b* and 252*c* into separate notes 252*a, b, c* and *d*. Adhesive stripes 256*a*, 256*b* and 256*c* provide each of the notes with a top and a bottom adhesive stripe.

The sheet of note paper 250 includes a flexible leading edge 258 extending across the top edge region of the sheet 250. This flexible leading edge 258 allows the sheet 250 to follow the complex paper path of the typical laser printer without jamming. The flexible leading edge 258 is particularly useful when the sheet 250 is somewhat stiff.

Figure 11:
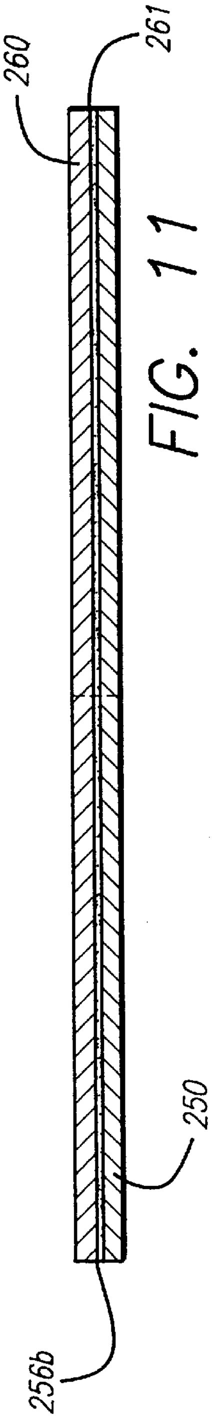
FIG. 11 is a cross-sectional view taken along Section 11—11 in FIG. 10.

A full sized backing sheet 260 completely covers the back of the sheet of note paper 250. This full sized backing sheet 260 is coated with a silicone release layer 261 (FIG. 11) so that it may be easily separated from the sheet of note paper 250. Referring to FIG. 11, the backing layer 260 covers over the adhesive stripes 256*a, b* and *c*, to prevent the adhesive from sticking to components on the interior of the printer. The backing sheet 260 may be perforated with perforation lines to match perforation lines 252 of the sheet of note paper. Consequently, the note paper assembly may be subdivided into two or more sections before being fed through the printer. To subdivide the note paper assembly, the user simply tears the assembly along one or more of the perforation lines 252 before printing the note. Alternatively, the user may print on the entire sheet and may separate the assembly into subsections along perforation lines 252 after the printing has been done.

As for exemplary dimensions, it is understood that the following dimensions are by way of example and not limitation. The assembly of FIG. 10 may be 8½" wide by 11" long. The flexible leading edge 258 may be ½" in length and may extend across the entire width of the assembly. Each note 254 may be 5¼" long by 4¼" wide. The adhesive stripe 256*a* may be 1" long and may extend across the entire width of the assembly. The adhesive stripe 256*b* may also be 1" long, with ½" of the length extending across the lower edges of the notes 254*d* and 254*c*, and the other ½" length extending across the notes 254*a* and 254*b*. The adhesive stripe 256*c* may be ½" long and may extend across the entire width of the assembly.

Figure 12:
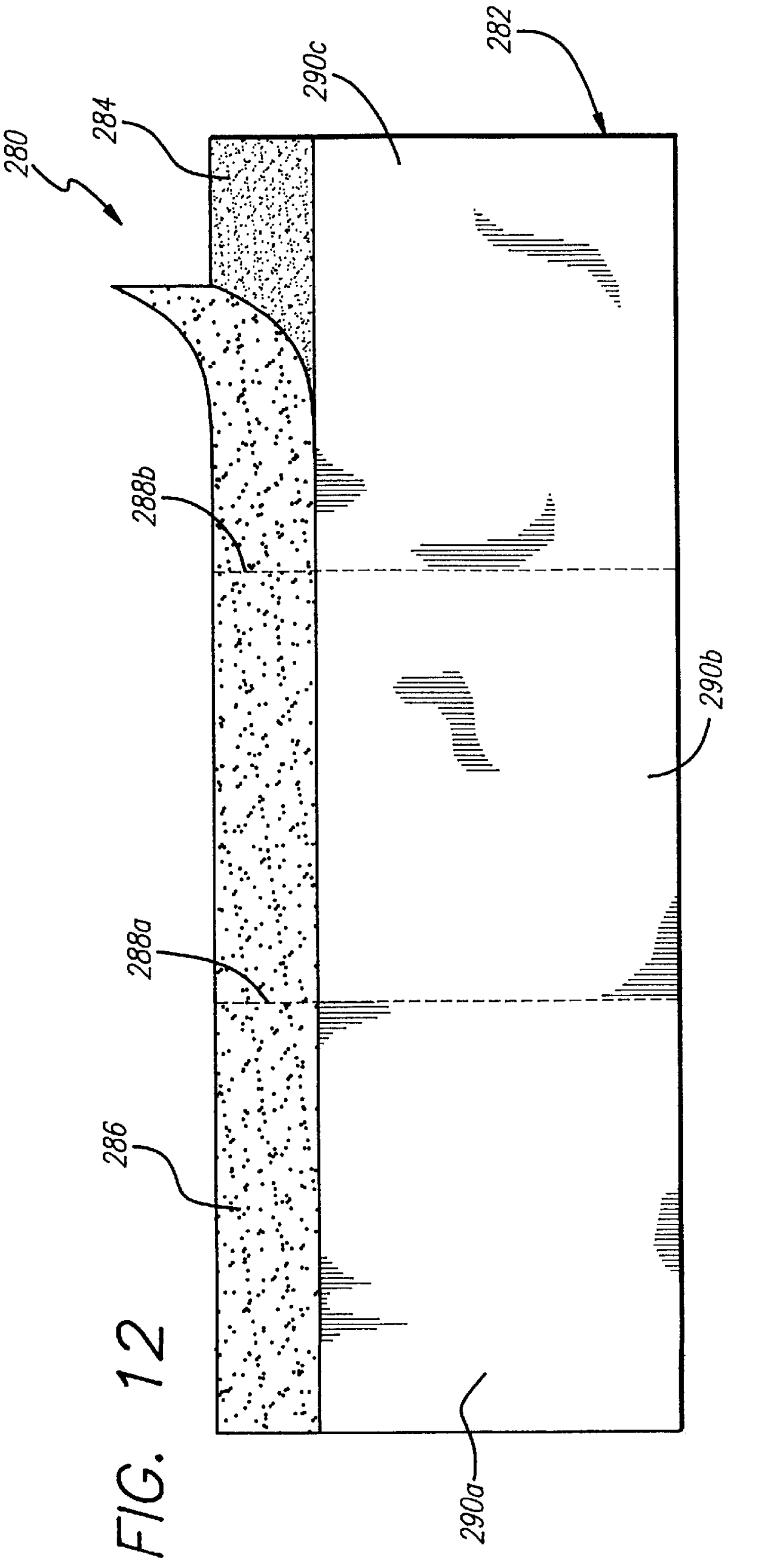
FIG. 12 is a perspective view of another embodiment of a divisible sheet of laser-printable notes having a backing strip to cover an adhesive stripe during printing and prior to use.

FIG. 12 illustrates a further embodiment of a divisible assembly for printing message notes. A laser note assembly 280 has a paper layer 282, an adhesive stripe 284 and a backing strip 286 adhered to the adhesive stripe 284. The backing strip 286 is coated with a release coating along the surface that is adjacent to the adhesive layer 284 to allow easy removal of the backing strip 286 from the adhesive layer 284 after printing. The laser note assembly 280 is divided by perforation lines 288*a* and 288*b* into individual notes 290*a*, 290*b* and 290*c*. The narrow backing strip 286 is substantially the same width as the adhesive stripe 284, leaving the remainder of the back of the paper sheet 282 (which may also be referred to in relative terms as the upper sheet) exposed.

The user may utilize the laser note assembly 280 in two different ways. First, the user may feed the entire laser note assembly 280 into a printer and print onto the front and/or back sides of the laser note assembly 280. Then, after printing, the user may subdivide the assembly 280 into the individual notes 290*a*, 290*b* and 290*c* by tearing along perforation lines 288*a* and 288*b*. Of course, if the user wishes to have a particularly long note, the user need not divide the assembly 280 along perforation lines 288*a* and 288*b*.

Alternatively, the user may divide the laser note assembly 280 into two or more subsections prior to printing. For instance, the user may separate the laser note assembly 280 into three separate notes 290*a*, 290*b* and 290*c* prior to printing. The user would then feed the individual notes into a printer for individual printing.

In either case, after printing, the user will remove the backing strip 286 from the laser note assembly 280 in order to adhere the notes 290 to a substrate. For example, a user might print a family message onto one of the surfaces of laser note assembly 280, then remove the backing strip 286 and post the note onto a kitchen refrigerator or other surface for the family to read. The notes 290 may be adhered to various surfaces for a wide variety of purposes.

It is noted that the embodiment of FIG. 12 is not perfectly flat, in that the backing strip does not cover the entire back surface of the assembly 280. However, the backing strip 286 is generally very thin, between about one and three mils, and the discontinuity in thickness at the edge of the backing strip is quite small. At least five to ten note assemblies may be stacked in a typical laser printer paper tray and individually fed into the printer without jamming. It is anticipated that, in most cases, the typical user will not want to print more than five to ten note assemblies at a time.

The following dimensions are by way of example only and not of limitation. The laser note assembly 280 may be 4" wide by 9" long. Each individual note 290 may be 4" long by 3" wide. The adhesive layer 284 may be ¾" wide and the backing strip 286 may be 13/16" wide, and both may extend across the entire length of the assembly 280. Of course, the assembly may be substantially larger for larger size notes or so that it may be subdivided into a greater number of notes. Alternatively, the embodiment of FIG. 12 may be subdivided into two rather than three notes, with a total dimension of 4" by 10" and with each note being 4" by 5" wide.

With regard to thicknesses, the paper layer may be between 2 and 4 mils thick, the adhesive layer may be on the order of between 0.25 mil and 1 mil thick, the release coating on the backing sheet may be less than 1 mil thick, and the backing sheet may be between approximately 1 and 3 mils thick. When assembled, the assembly may be between about 3.35 mils and 8.25 mils thick.

Regarding materials, the laser note assemblies of FIGS. 10–12 may be constructed as follows. The adhesive may be an acrylic adhesive that does not become permanent over time, so that a note may be removed from a substrate long after it has been adhered thereto. The adhesive should also be temperature stable at the high temperatures generated in a laser printer or photocopier. Two such adhesives are available from Moore Corporation Limited of Toronto, Canada, through its Moore Business Forms division under the trade names Clean Tack and Clean Tack 2.

The paper layer 282 may be coated to prevent sticking if the paper is rewound onto itself during the manufacturing process. The Georgia Pacific Corporation of Pickerington, Ohio manufactures one such paper under the trade designation, Repositional C2S Basestock. The basis weight of that particular sheet is sub 20.9 lb Bond (17"×22"–500 ream size), or approximately a 50# Offset. The manufacturer applies a tie-coat to the wire side of the paper and a release coat to the felt side. The adhesive strip is then applied to the tie-coated side of the paper.

The backing strip, paper, adhesive and release coatings may be selected so that the entire assembly is repulpable and/or recyclable. Generally speaking, a suitable paper coated with a silicone release coating is recyclable and repulpable. The Moore Corporation Limited of Toronto, Canada, through its Moore Business Forms division, sells a 20# bond paper having a silicone release coating. The caliper of the paper is 3.7 mil, and the paper is recyclable and repulpable. The Clean Tack and Clean Tack 2 adhesives described above are also repulpable if used with a compatible repulping process.

The paper may be white, or may have a particular coloring, such as yellow, blue, pink or other color.

By way of example and not of limitation, the embodiment of FIG. 1 may have the following dimensions. Label sheet 20 may be a standard 8½ by 11 inch sheet. Leading edge portion 36 may be ½-inch long. Each subsection may be 4 inches wide by 5½ inches long. Each label may be 2½ inches wide by 1 inch long. Each label set 34 may be centered within a subsection, with a ½-inch border at the top and bottom and a ¾ inch border along either side. Of course, these dimensions may be substantially varied without departing from the scope of the invention.

As a further example, the embodiment of FIG. 7 may be 4¼ inches wide by 10 or 11 inches long. Each subsection may therefore be 4¼ inches wide by 5 or 5½ inches long, which is a convenient size for printing small numbers of labels.

The microperforations of FIG. 7 are shown somewhat enlarged for clarity of illustration. As noted earlier, microperforations generally have at least 35 cuts and ties per inch. The assembly of FIG. 7 may be approximately 5 to 10 mils thick, with the label layer having an approximate thickness of 4 to 6 mils, the adhesive layer being on the order of 1 mil thick, the release coating on the backing sheet being less than 1 mil thick, and the backing sheet being approximately 2 or 3 mils thick. In general, the assembly should be no more than 15 mils thick to properly print in a laser printer. The foregoing dimensions are merely illustrative and greater or lesser thicknesses may be employed for particular applications, and the backing sheet may be of the same material as the top sheet.

It should be noted that with respect to embodiments of the present invention for printing cards, the card stock sheet may generally be as thick as 8 mils without needing to have a line of perforations inset from the leading edge to prevent jamming in the printer. It is anticipated that most card embodiments will be between 7 and 10 mils thick. In some embodiments greater than 8 mils thick, it is presently preferred to space a line of flexibility perforations approximately ½-inch from the leading edge to avoid jamming in the complex paper feed path of many laser printers and photocopiers.

With respect to the dimensions of embodiments of the present invention, modern-day laser printers generally will not print sheet sizes less than approximately 3 inches wide or less than approximately 4 inches long. However, printer technology is constantly evolving. Consequently, the present invention is not limited to these dimensions. As printers are developed that will accept sheet sizes narrower than 3 inches and/or shorter than 4 inches, the minimum dimensions of embodiments of the present invention may decrease accordingly.

Similarly, the minimum thickness of the present invention may increase as printers evolve to accept sheets that are thicker than approximately 15 mils, and the maximum width may be increased beyond 8½ inches. Additionally, new types of printers other than laser printers, ink jet printers and photocopiers may be developed in the future. Accordingly, the assemblies of the present invention are not limited to use in presently popular printers, but may be used in future types printers that will print onto subsections of a larger label or sheet assembly.

In conclusion, it is to be understood that the foregoing detailed description and the accompanying figures relate to presently preferred embodiments of the invention. Various changes and modifications may be made without departing from the spirit and scope of the invention. Thus, by way of example and not of limitation, each subsection may have any number of labels other than the three or four labels per subsection shown in the drawings. Indeed, the entire subsection could be a single large label. Similarly, the individual labels may have any of a variety of shapes, including triangular, circular, polygonal, and so on. The full size sheets may be legal sized, may be A4 size paper, or any other desired size, such as 9 inch long paper or other non-standard size sheets.

Although the embodiments described herein have featured four or two subsections, various other arrangements of subsections are possible. For instance, a label sheet may have six subsections, with three subsections on the top of the sheet and another three on the bottom of the sheet. Alternatively, the sheet could be divided into three or more narrow subsections rather than two.

Other variations are also apparent. To increase flexibility, the lines of flexibility can be perforated instead of being die cut. The perforations may extend through just the label layer and not the backing layer, or may extend through both.

If a user wishes to print more than a single subsection at once, he or she need not break the full sheet into all of the possible subsections, but can print two or more adjoining subsections at the same time. The user can even put whole sheets of labels in a paper tray for automatic feeding if the user wants to print several labels at once.

The backing sheet in the double-thickness sheet embodiments is not necessarily coextensive with the upper sheet which is to be printed. Thus, for example, if the pressure sensitive adhesive is only applied to a portion of the upper sheet, the backing sheet need only cover the adhesive-covered portion of the upper sheet, and the upper sheet could be folded over to provide the backing sheet.

With respect to the sheet of notes, a larger number of notes may be provided than is illustrated in the figures. For instance, a subsection may include several 1½" by 2" notes, or other small dimensions, with each note having at least one adhesive stripe thereon. The subsection itself would be large enough to prevent jamming in the printer, but would be separated into the individual notes after printing. Furthermore, the note embodiments of the present invention may be made with a light cardstock or other material rather than a sheet of paper.

Accordingly, the present invention is not limited to the specific embodiments shown in the drawings and described in the detailed description.

What is claimed is:

1. An assembly for printing postable note papers in an office printer comprising:

a sheet of note paper having a front and a back;

at least one adhesive stripe area extending transversely across the back of said sheet of note paper, the back of said note paper being free of adhesive except in said at least one adhesive stripe area;

a sheet of removable, adhesive-free backing material covering said adhesive stripe area, said sheet of note paper being removably mounted on said sheet of backing material; and at least one line of weakness dividing said sheet into separable notes;

wherein said adhesive is time stable and does not become a permanent adhesive over time; and wherein said sheet is separable along said lines of weakness into a plurality of notes, each note having a stripe of adhesive extending along an edge thereof.

2. An assembly as defined in claim 1, wherein said sheet comprises an upper right, a lower right, an upper left and a lower left note, said upper and lower notes being separated by a first line of weakness, said right and left notes being separated by a second line of weakness.

3. An assembly as defined in claim 2, wherein a first stripe of adhesive extends along a bottom edge of said lower notes, a second stripe of adhesive extends across a top edge of said lower notes and a bottom edge of said top notes, and a third stripe of adhesive extends across a top edge of said upper notes.

4. An assembly as defined in claim 1, wherein said removable backing material comprises a strip that just covers said adhesive stripe.

5. An assembly as defined in claim 1, wherein the assembly comprises a plurality of adhesive stripes, each stripe being covered by a release strip.

6. An assembly as defined in claim 1, wherein said at least one adhesive stripe area constitutes only one adhesive stripe.

7. An assembly as defined in claim 1 wherein:

said assembly has only one adhesive stripe area, which extends across an edge of the back of said sheet of note paper, the remainder of the back of said paper sheet being free of adhesive;

said backing material comprises a strip of removable adhesive-free backing material that covers said one adhesive stripe area, said backing strip having substantially the same dimensions as the stripe area of adhesive, said strip being separate from said sheet of note paper; and each note has an adhesive stripe along an edge of the note.

8. An assembly for printing postable notes comprising:

a sheet of note paper having a front and a back;

at least one adhesive stripe area extending across an edge of the back of said sheet of note paper, the major portion of the back of said paper sheet being free of adhesive;

removable, adhesive-free backing material covering said at least one adhesive stripe area; and at least one line of weakness dividing said assembly into separable subsections;

wherein said adhesive is time stable and does not become a permanent adhesive over time;

whereby the assembly is separable into one or more subsections for feeding into printers such as laser and inkjet printers and photocopiers, to print said printing.

9. An assembly as defined in claim 8, wherein said sheet comprises an upper right, a lower right, an upper left and a lower left note, said upper and lower notes being separated by a first line of weakness, said right and left notes being separated by a second line of weakness.

10. An assembly as defined in claim 9, wherein a first stripe of adhesive extends along a bottom edge of said lower notes, a second stripe of adhesive extends across a top edge of said lower notes and a bottom edge of said top notes, and a third stripe of adhesive extends across a top edge of said upper notes.

11. An assembly as defined in claim 8, wherein said removable backing material comprises a strip that just covers said adhesive stripe.

12. An assembly as defined in claim 8, wherein the assembly comprises a plurality of adhesive stripes, each stripe being covered by a release strip.

13. An assembly as defined in claim 8, wherein said at least one adhesive stripe area constitutes only one adhesive stripe.

14. An assembly as defined in claim 8 wherein:

said assembly has only one adhesive stripe area, which extends across an edge of the back of said sheet of note paper, the remainder of the back of said paper sheet being free of adhesive;

said backing material comprises a strip of removable adhesive-free backing material that covers said one adhesive stripe area, said backing strip having substantially the same dimensions as the stripe area of adhesive, said strip being separate from said sheet of note paper; and each note has an adhesive stripe along an edge of the note.

15. A versatile method for preparing and printing adhesively-backednotes comprising the steps of:

preparing a divisible note assembly as defined in claim 8;

separating at least one of said subsections from said assembly;

printing onto a said at least one of said subsections with a printer;

after printing, removing the backing material from said at least one subsection; and after removing the backing material, adhering the subsection to a substrate.

16. A versatile method for preparing and printing adhesively-backednotes comprising the steps of:

preparing a divisible note assembly as defined in claim 14;

separating at least one of said subsections from said assembly;

printing onto a said at least one of said subsections with a printer;

after printing, removing the backing material from said at least one subsection; and after removing the backing material, adhering the subsection to a substrate.

17. An assembly for printing postable note papers in an office printer comprising:

a sheet of note paper having a front and a back;

adhesive stripe areas extending transversely across the back of said sheet of note paper, the back of said note paper being free of adhesive except in said adhesive stripe areas;

a sheet of removable, adhesive-free backing material covering said adhesive stripe areas, said sheet of note paper being removably mounted on said sheet of backing material; and a plurality of lines of weakness dividing said sheet into separable notes, at least one of said lines of weakness extending along one of said adhesive stripes;

wherein said adhesive is time stable and does not become a permanent adhesive over time; and wherein said sheet is separable along said lines of weakness into a plurality of notes, each note having a stripe of adhesive extending along an edge thereof.

* * * * *